(12) United States Patent
Ozaki et al.

(10) Patent No.: US 8,233,168 B2
(45) Date of Patent: Jul. 31, 2012

(54) IMAGE FORMING APPARATUS FOR CONVERTING LIGHTS TO GENERATE AND STORE ELECTRICAL POWER

(75) Inventors: Yusuke Ozaki, Tokyo (JP); Eiji Nemoto, Tokyo (JP); Hiroki Ohkubo, Kanagawa (JP); Yuji Matsuda, Tokyo (JP); Hiroyuki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 917 days.

(21) Appl. No.: 12/032,166

(22) Filed: Feb. 15, 2008

(65) Prior Publication Data

US 2008/0198425 A1 Aug. 21, 2008

(30) Foreign Application Priority Data

Feb. 16, 2007 (JP) ................................. 2007-036501
Nov. 27, 2007 (JP) ................................. 2007-306329

(51) Int. Cl.
*H04N 1/04* (2006.01)
(52) U.S. Cl. ....... 358/1.14; 358/474; 358/475; 358/476; 358/477; 358/478; 358/479; 358/480; 358/481; 358/482; 358/483; 358/484; 358/485; 358/486; 358/487
(58) Field of Classification Search .................. None
See application file for complete search history.

(56) References Cited

U.S. PATENT DOCUMENTS

| 2002/0054391 | A1* | 5/2002 | Sakai | 358/514 |
| 2004/0233295 | A1* | 11/2004 | Hoshuyama | 348/222.1 |
| 2005/0052681 | A1* | 3/2005 | Kogi | 358/1.14 |
| 2006/0203495 | A1* | 9/2006 | Mikajiri et al. | 362/341 |
| 2006/0256399 | A1* | 11/2006 | Murakami et al. | 358/468 |

FOREIGN PATENT DOCUMENTS

| JP | 62-076347 | 5/1987 |
| JP | 62-151551 | 9/1987 |
| JP | 03-087760 | 4/1991 |
| JP | 2004-088649 | 3/2004 |
| JP | 2004088649 | * 3/2004 |
| JP | 2004-254249 | 9/2004 |
| JP | 2005-328187 | 11/2005 |

OTHER PUBLICATIONS

Eiji Nemoto; "image forming apparatus"; JP Pub Date Mar. 2004; English machine translation of JP Pub No. 2004088649.*
Eiji Nemoto; "Image Forming Apparatus"; JP Pub Date Mar. 2004; Machine Translation in English of JP Pub No. 2004088649.*

* cited by examiner

*Primary Examiner* — Benny Q Tieu
*Assistant Examiner* — Haris Sabah
(74) *Attorney, Agent, or Firm* — Dickstein Shapiro LLP

(57) ABSTRACT

In an image forming apparatus, an energy converting unit receives light from an optical source and converts the light into electric power, and an electrical storage unit stores therein the electric power. The energy converting unit is arranged in such a manner that a relative position of the energy converting unit to the optical source is always constant when a reading unit is reading an image.

5 Claims, 4 Drawing Sheets

IMAGE FORMING APPARATUS FOR CONVERTING LIGHTS TO GENERATE AND STORE ELECTRICAL POWER

CROSS-REFERENCE TO RELATED APPLICATIONS

The present application claims priority to and incorporates by reference the entire contents of Japanese priority documents 2007-036501 filed in Japan on Feb. 16, 2007 and 2007-306329 filed in Japan on Nov. 27, 2007.

BACKGROUND OF THE INVENTION

1. Field of the Invention

The present invention relates to an image forming apparatus.

2. Description of the Related Art

An image forming apparatus includes various components (load), and electric power needs to be supplied to that loads. Examples of the load include a sheet transporting system, a motor for driving a photosensitive member and the like, various chargers, a heater of a fixing device, and a control board. It is desirable to reduce such electric power used in energy-saving mode of the image forming apparatus, preferably reducing the amount of the electric power to zero.

For reducing the electric power to zero at the time of energy-saving mode, it is necessary to supply electric power by a battery of an image forming apparatus. However, extra energy is required for charging the battery, and if such energy is obtained from an alternating current supply, the total energy of the image forming apparatus is not sufficiently saved. Thus, charging the battery using a unit other than a power supply (commercial power supply) generally preinstalled in the image forming apparatus is necessary. An image forming apparatus using a photo-electric cell (solar battery) as the unit other than the commercial power supply is widely known. However, the image forming apparatus is usually installed inside a room and chances of receiving sunlight are less. Thus, by using the solar battery, it is difficult to effectively save energy.

Furthermore, a lamp-light of a scanner is also used in a conventional technology. Specifically, when scanning an original document, utilization of an amount of the lamp-light is very less; and therefore, a major amount of a light illuminating the original document is not used. Thus, by storing such unused energy in the battery, the total energy of the image forming apparatus can be saved.

The conventional technologies for such image forming apparatus are disclosed in Japanese Patent Application Laid-open No. H3-87760 and Japanese Patent Application Laid-open No. 2004-88649. In the former technology, the photo-electric cell is arranged in the image forming apparatus that forms an image by illuminating an original document using an illuminating lamp. Specifically, the photo-electric cell is mounted on a position where the light of the illuminating lamp is received, and electric power is supplied from the photo-electric cell to at least one component of the image forming apparatus. In the latter technology, the image forming apparatus having an original-document reading unit includes an energy converting unit and an electrical storage unit for generating and storing electric power. Specifically, the image reading unit reads the image on the original document by illuminating the original document using a scanner lamp. The energy converting unit converts, upon receiving the light from the scanner lamp, light energy into electric power. The electrical storage unit stores therein electric power converted by the energy converting unit. Thus, by disposing the photo-electric cell at a base plate portion of the scanner, and by using the lamp-light of the scanner, electric power can be generated. By charging that electric power to the electrical storage unit, electric power can be used in the energy-saving mode.

In the conventional technologies mentioned above, the photo-electric cell is fixed to a base plate portion of the scanner. Therefore, the amount of light fluctuates depending on a scanning position at the time of the scanner operations. Thus, the energy cannot be effectively stored. For controlling fluctuations of the amount of light to effectively store the energy, an area of the photo-electric cell needs to be widened. Consequently, a necessary cost increases.

SUMMARY OF THE INVENTION

It is an object of the present invention to at least partially solve the problems in the conventional technology.

According to an aspect of the present invention, there is provided an image forming apparatus having an optical source that outputs light for reading an original document and a reading device that reads an image on the original document by irradiating light from the optical source on the original document. The image forming apparatus includes an energy converting unit that receives light from the optical source and converts the light into electric power; and an electrical storage unit that stores therein the electric power, wherein the energy converting unit is arranged in such a manner that a relative position of the energy converting unit to the optical source is always constant when the reading unit is reading an image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
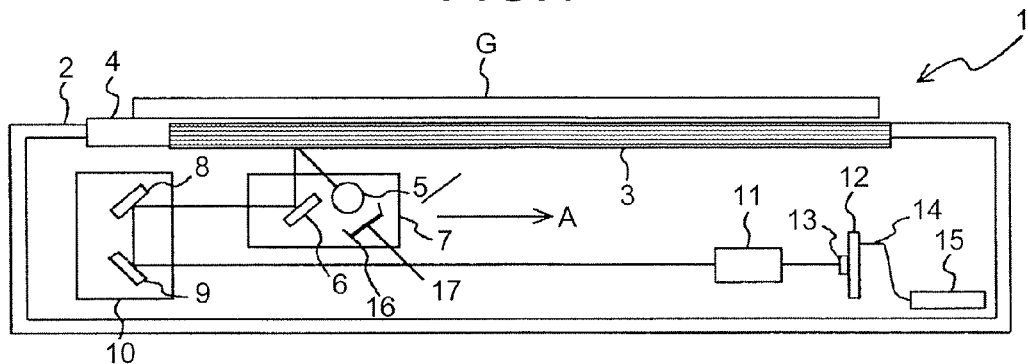
FIG. 1 is a schematic for explaining an overview of a reading unit in an image forming apparatus according to an embodiment of the present invention.

Exemplary embodiments of the present invention are explained in detail below with reference to the accompanying drawings.

In the following embodiments, an optical source corresponds to a xenon lamp 5; a reading unit corresponds to a first mirror 6 mounted on a first carriage 7, a second mirror 8 and a third mirror 9 mounted on a second carriage 10, a lens unit 11, and a charge coupled device (CCD) 13, an energy converting unit corresponds to photo-electric cells 17, 18, 20, 21, 22, 23, and 51; and an electrical storage unit corresponds to a capacitor 52. A reflecting unit corresponds to a reflector 16, a photoelectric transducer corresponds to the CCD 13, a first mirror corresponds to the first mirror 6, a carrier corresponds to the first carriage 7, an imaging lens corresponds to the lens unit 11, and an outgoing port positioned on a side opposite to an outgoing port of the xenon lamp 5 for outputting light toward an original document corresponds to a reference numeral 5a2.

FIG. 1 is a schematic for explaining an overview of an image reading unit 1 in an image forming apparatus according to an embodiment of the present invention.

The image reading unit 1 according to the embodiment includes a contact glass 3 on an upper surface of a case 2 and a white base plate 4. The case 2 accommodates the xenon lamp 5, which is the optical source, the first carriage 7 on which the first mirror 6 is mounted, the second carriage 10 on which the second mirror 8 and the third mirror 9 are mounted, the lens unit 11, a sensor board unit 12, a signal processor 15, and a home position sensor (not shown). The CCD 13 is mounted on the sensor board unit 12, and the sensor board unit 12 is connected to the signal processor 15 via the signal cable 14. The signal processor 15 includes a central processing unit (CPU) (not shown). The CPU processes signals input from the CCD 13, and exercises a lighting control of the optical source of the image reading unit 1, a movement control of the first carriage 7 and the second carriage 10, and overall controls of the image reading unit 1. A scanner motor (not shown) drives the first carriage 7 and the second carriage 10. By controlling a driving of the scanner motor, the CPU controls the movement of the first carriage 7 and the second carriage 10.

The second carriage 10 is disposed in a vertical scanning direction (a horizontal direction indicated by an arrow A in FIG. 1) more on a left side than the first carriage 7 shown in FIG. 1. At the time of reading an original document G, the second carriage 10 moves in the vertical scanning direction simultaneously with the first carriage 7 in such a manner that a distance (light path) from an original document surface on a reading position to an imaging surface of the CCD 13 is not changed, and reads an image on the original document G set on the contact glass 3.

On the top of the contact glass 3, a pressure plate (not shown) is disposed that can open and close an upper surface of the contact glass 3. An operator opens the pressure plate for setting the original document G on the contact glass 3, and, by closing the upper surface of the contact glass 3, the set original document G is pressed against the contact glass 3.

In the image reading unit 1, when the first carriage 7 and the second carriage 10 move in the vertical scanning direction, light from the xenon lamp 5 mounted on the first carriage 7 is irradiated on the original document G set on the contact glass 3, and light reflected by the original document G is read out. The light irradiated on the original document G is formed of direct light from the xenon lamp 5 and indirect light from the reflector 16 that is disposed at the rear side of the xenon lamp 5. If only the direct light from the xenon lamp 5 is irradiated on the original document G, an amount of light to be irradiated with respect to entire outgoing light from the xenon lamp 5 on the original document G is not sufficient, reducing operational efficiency. Thus, for increasing the efficiency, the reflector 16 is disposed so that the light outgoing to the opposite side can be used as the irradiating light.

Image reading is carried out in such a manner that the light is sequentially reflected on the first mirror 6 mounted on the first carriage 7, the second mirror 8 and the third mirror 9 mounted on the second carriage 10; a reduced imaging is carried out on an imaging surface of the CCD 13 using the lens unit 11; and the light incident on the CCD 13 is photo-electrically converted. In the image reading unit 1, as described earlier, the scanner motor drives the first carriage 7 and the second carriage 10. The first carriage 7 and the second carriage 10 are driven so that their speed ratio becomes 2:1; and therefore, the image reading unit 1 can scan without changing the optical length.

As the home position sensor, a transmission-type optical sensor such as a photo coupler is used. The home position sensor is used for detecting a home position of the first carriage 7 and the second carriage 10, especially for detecting the home position of the first carriage 7.

In the image reading unit 1, before reading the original document G, the CPU moves the first carriage 7 and the second carriage 10 to the reading position of the white base plate 4, irradiates the light from the xenon lamp 5 on the white base plate 4, reads, in the similar way when reading the original document G, the reflected light from the white base plate 4, and retrieves shading correction data based on an output from the CCD 13. Next, the CPU moves the first carriage 7 and the second carriage 10 to the home position, and, from the home position, optically scans the original document G by irradiating the light from the xenon lamp 5 on the original document G set on the contact glass 3 to read the image on the original document G. Thus, the optical source (xenon lamp 5) is also described as a scanner lamp in this document.

In the image forming apparatus according to the embodiment, the photo-electric cell is mounted inside the image reading unit 1 to generate electric power from light output from the xenon lamp 5. Specifically, electric power is generated from light received from the xenon lamp 5, i.e., an optical energy is converted into an electrical energy, and generated electric power is stored so that electric power from other than a commercial power supply equipment can be used in the image reading unit 1. The embodiments explained below indicate variations in mounting position of the photo-electric cell. A mechanical structure described earlier and a control structure described later are commonly included in the embodiments explained below.

Figure 2:
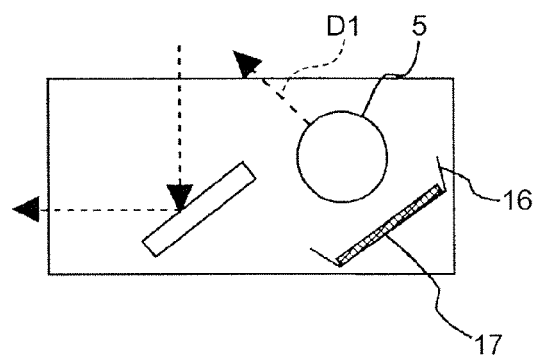
FIG. 2 is a schematic for explaining an internal structure of a first carriage according to a first embodiment of the present invention.

FIG. 2 is a schematic for explaining an overview of the first carriage 7 according to a first embodiment of the present invention. In the image reading unit 1, as shown in FIGS. 1 and 2, the photo-electric cell 17 is arranged in such a manner that a light incidence surface of the photo-electric cell 17 faces a reflecting surface of the reflector 16 that is disposed on a side opposite to an outgoing direction D1 of light from the xenon lamp 5 towards the original document G in the first carriage 7. In other words, the light incidence surface of the photo-electric cell 17 is attached to a surface facing the xenon lamp 5. The xenon lamp 5 is arranged along a main scanning direction. Thus, the photo-electric cell 17 is also arranged along the main scanning direction of the reflector 16 in the first carriage 7.

If the photo-electric cell 17 is arranged in the above mentioned manner, while reading the original document G, the xenon lamp 5 and the photo-electric cell 17 integrally move in the vertical scanning direction without changing their relative position. Therefore, when the xenon lamp 5 is illuminated, a fixed amount of light including reflected light from the original document G is incident on the photo-electric cell 17, and a fixed amount of electric power can be obtained. Obtained electric power is stored in the capacitor 52, which is described later, and can be used at the time of activating the image forming apparatus or the like as appropriate. Therefore, the energy can be effectively saved.

According to the first embodiment, the photo-electric cell 17 is mounted on the reflector 16. Thus, the relative position between the xenon lamp 5 and the photo-electric cell 17 does not change at the time of reading the original document G. Furthermore, the direct light of the xenon lamp 5 outgoing to the side opposite to the side for irradiating an original document can be effectively used. Thus, with a fixed amount of light, electric power can be effectively stored in a small area.

It is noted that a halogen lamp can also be used as the optical source in the image forming apparatus.

Figure 3:
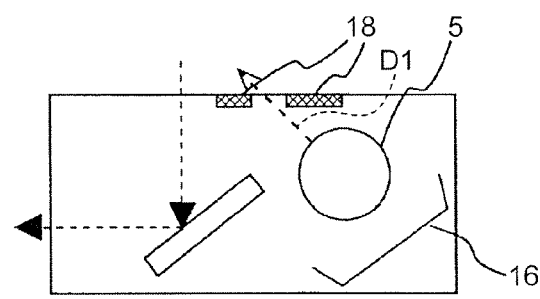
FIG. 3 is a schematic for explaining an internal structure of a first carriage according to a second embodiment of the present invention.

FIG. 3 is a schematic for explaining the overview of the first carriage 7 according to a second embodiment of the present invention. The photo-electric cells 18 are arranged on a portion that does not affect reading of the original document G using irradiating light (outgoing direction D1) outgoing from the xenon lamp 5 in the first carriage 7. In other words, the photo-electric cells 18 are attached to a portion of the first carriage 7 where reflected light from the original document G is not incident on the CCD 13 even if the original document G is irradiated by the outgoing light from the xenon lamp 5. Specifically, only the area in the main scanning direction and the vertical scanning direction corresponding to a reading line of the original document G is opened in the form of a slit, and the photo-electric cells 18 are mounted in a periphery of the opening.

Thus, the direct light from the xenon lamp 5 that is not used as illuminating light can be converted into electric power by the photo-electric cells 18. Furthermore, the outgoing light outgoing to the side opposite to the original document G is reflected by the reflector 16 and can be incident as the indirect light in a predetermined ratio, increasing electric power of the incident indirect light.

If technologies in the second embodiment is combined with those of the first embodiment, from the outgoing light outgoing from the xenon lamp 5, a vast amount of light other than the light used for reading the original document G can be incident on the photo-electric cells 17 and 18. Therefore, a usage efficiency of the outgoing light from the xenon lamp 5 can be enhanced.

According to the second embodiment, the photo-electric cells 18 are mounted on a portion, in the first carriage 7, which is irradiated by light from the xenon lamp 5 so that the photo-electric cells 18 receives the light not used for illuminating the original document G. With this configuration, the relative position between the xenon lamp 5 and the photo-electric cells 18 does not change at the time of reading the original document G, and electric power can be effectively stored in the small area with the fixed amount of light.

It is noted that a fluorescent lamp can also be used as the optical source.

Figure 4:
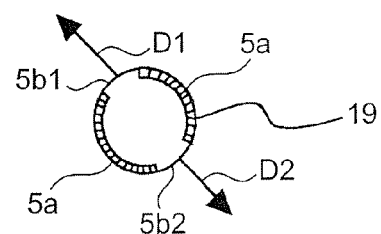
FIG. 4 is a schematic of a xenon lamp according to a third embodiment of the present invention.
Figure 5:
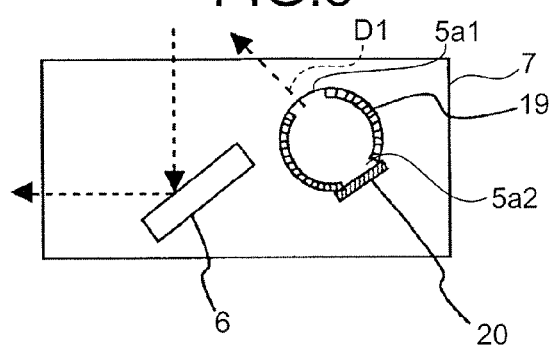
FIG. 5 is a schematic for explaining an internal structure of a first carriage according to the third embodiment.

FIG. 4 is a schematic of the xenon lamp 5 of the image reading unit 1 according to a third embodiment of the present invention; and FIG. 5 is a schematic for explaining the overview of the first carriage 7 according to the third embodiment. As shown in FIG. 4, two directions are specified as outgoing directions of the light from the xenon lamp 5. Specifically, light shielding units 19 shown by oblique lines are arranged along a circular direction, and the illuminating light is outgoing from two openings 5b1 and 5b2. Because the openings 5b1 and 5b2 are provided on an opposite direction of 180 degrees, illuminating light is outgoing in the opposite direction of D1 and D2 from the openings 5b1 and 5b2.

Upon using the xenon lamp 5, only the outgoing light from an opening 5a1 facing the original document G is used as the illuminating light. The photo-electric cell 20 is arranged in such a manner that an incidence surface of the photo-electric cell 20 faces the opening 5a2 that outputs light in a direction opposite to the original document G to prevent a leakage of the light from the opening 5a2. Therefore, the entire light outgoing from the opening 5a2 is incident on the photo-electric cell 20, and the indirect light reflected by the light shielding unit 19 is also incident on the photo-electric cell 20. Thus, electric power equivalent to the total optical energy of the light outgoing from the opening 5a2 and the indirect light reflected by the light shielding unit 19 can be obtained. Furthermore, because the reflector 16 is not required, a cost of the reflector 16 can also be reduced.

According to the third embodiment, the xenon lamp 5 and the photo-electric cell 20 move integrally in the vertical scanning direction without changing the relative position between the xenon lamp 5 and the photo-electric cell 20 at the time of reading the original document G. Therefore, power can be effectively stored in the small area with the fixed amount of light. Furthermore, the unused light outgoing from the rear side of the xenon lamp 5 can be converted into electric power. As a result, the converted electric power can be effectively stored.

Figure 6:
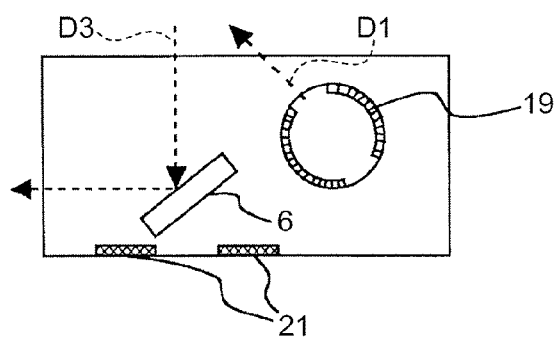
FIG. 6 is a schematic for explaining an internal structure of a first carriage according to a fourth embodiment of the present invention.

FIG. 6 is a schematic for explaining the overview of the first carriage 7 of the image reading unit 1 according to a fourth embodiment of the present invention. The photo-electric cells 21 are arranged in such a manner that the photo-electric cells 21 can receive the light deviated from a receiving range of the reflecting light that reaches the first mirror 6. Specifically, the irradiating light output from the xenon lamp 5 and reflected by the original document surface is diffused and reaches the first mirror 6. The diffused reflected light from the original document G also reaches the position deviated in the vertical scanning direction with respect to the first mirror 6. At this state, the photo-electric cells 21 are fixedly attached to the positions that are deviated from the first mirror 6 and where the reflecting light can be reached. Therefore, the reflecting light not used at the time of reading the original document G can be converted into electric power.

The positions where the photo-electric cells 21 are mounted correspond to reflex paths of the outgoing light from the xenon lamp 5 for the original document G, and that do not interfere with reading of the original document G.

The reflector 16 is not shown in FIG. 6; however, the reflector 16 can be arranged as shown in FIG. 3.

According to the fourth embodiment, the reflecting light from the original document G can be effectively used without changing the relative position between the xenon lamp 5 and the photo-electric cells 21 at the time of reading the original document G. Therefore, electric power can be effectively stored in the small area with the fixed amount of light.

Figure 7:
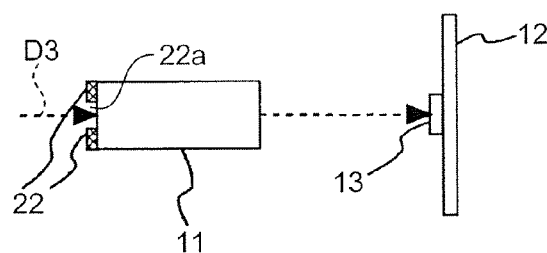
FIG. 7 is a schematic for explaining an internal structure of an image reading device according to a fifth embodiment of the present invention.

FIG. 7 is a schematic for explaining arrangement of the photo-electric cell 22 in such a manner that the photo-electric cell 22 does not interfere with reading by the lens unit in the reduced imaging system of the image reading unit 1 according to a fifth embodiment of the present invention. Specifically, in the configuration where the reflecting light from the original document G is incident on the lens unit 11 via the first mirror 6, the second mirror 8 and then the third mirror 9, the photo-electric cell 22 is arranged on a portion in the lens unit 11 where the reflecting light from the original document G enters and in a range not affecting reading of the original document G. Therefore, the photo-electric cell 22 can receive the light thereby obtaining electric power. At this state, the photo-electric cell 22 is attached in an annular shape centered about an optical axis of the lens unit 11 in the range where the reflecting light is not incident on the imaging surface of the CCD 13. Reading light is guided from a circular hole potion 22*a* that is in a surrounding area of a central optical axis D3 and is also guided to the CCD 13.

With this configuration, a scanning optical system moves the first carriage 7 and the second carriage 10 so that the optical path from the original document G to the CCD 13 is not changed; and therefore, the relative position (distance) of the photo-electric cell 22 to the xenon lamp 5 is not changed.

According to the fifth embodiment, the photo-electric cell 22 is mounted in a surrounding portion, which is not related with the reading operation, of the optical axis D3 of the lens unit 11 that does not obstruct the imaging in an immobile portion. Thus, electric power can be effectively stored in the small area with the fixed amount of light.

Figure 8:
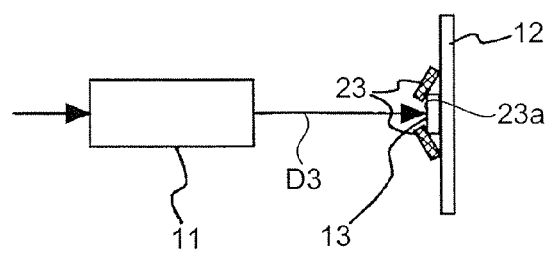
FIG. 8 is a schematic for explaining an internal structure of an image reading device according to a sixth embodiment of the present invention.

FIG. 8 is a schematic for explaining an arrangement of the photo-electric cell 23 to a portion, in such a manner that the photo-electric cell 23 does not interfere with reading, of the CCD in the reduced optical system of the image reading unit according to a sixth embodiment of the present invention. Specifically, the reflecting light from the original document G is incident on the lens unit 11 via the first mirror 6, the second mirror 8 and then the third mirror 9, and the image is formed on the imaging surface of the CCD 13. The photo-electric cell 23 is arranged on a portion in the CCD 13 where the reflecting light from the original document G enters and in a range not affecting reading of the original document G. Therefore, the photo-electric cell 23 can receive the light, thereby obtaining electric power. At this state, the photo-electric cell 23 is attached in an annular shape centered about an optical axis D3 of the lens unit 11 in the range where the reflecting light is not incident on the imaging surface of the CCD 13. The reading light is guided to the CCD 13 from a circular hole potion 23*a* that is in a surrounding area of the central optical axis D3.

With this configuration, a scanning optical system moves the first carriage 7 and the second carriage 10 so that the optical path from the original document G to the CCD 13 is not changed; and therefore, the relative position (distance) of the photo-electric cell 23 to the xenon lamp 5 is not changed.

According to the sixth embodiment, the photo-electric cell 23 is mounted in an axial periphery of the CCD 13 that does not obstruct imaging in the immobile portion and the light irradiating on a portion other than reading image elements of the CCD 13 can be effectively used. Thus, power can be effectively stored in the small area with the fixed amount of light. The image reading unit 1 internally includes an enclosed structure to prevent light leakage. Accordingly, the reflecting light from the original document G that is not incident on the lens unit 11 is incident on the photo-electric cell 23. Thus, the efficiency of the photo-electric cell 23 can be increased.

In the first to the sixth embodiments, it is explained that the photo-electric cells 17, 18, 20, 21, 22, and 23 are respectively mounted on the reflecting surface of the reflector 16, the surface of the first carriage 7 on the original document G side facing the xenon lamp 5, the opening 5*a*2 on the side opposite to the original document G side of the xenon lamp 5, the surface at the back of the first mirror 6 mounted in the first carriage 7, the surface on the incidence side of the lens unit 11, and the irradiating side other than the reading image elements of the CCD 13. However, by arbitrarily combining the first, second, fourth, fifth, and sixth embodiments, or the second, third, fourth, fifth, and sixth embodiment, the optical energy can be obtained more effectively and can be converted into electric power.

Figure 9:
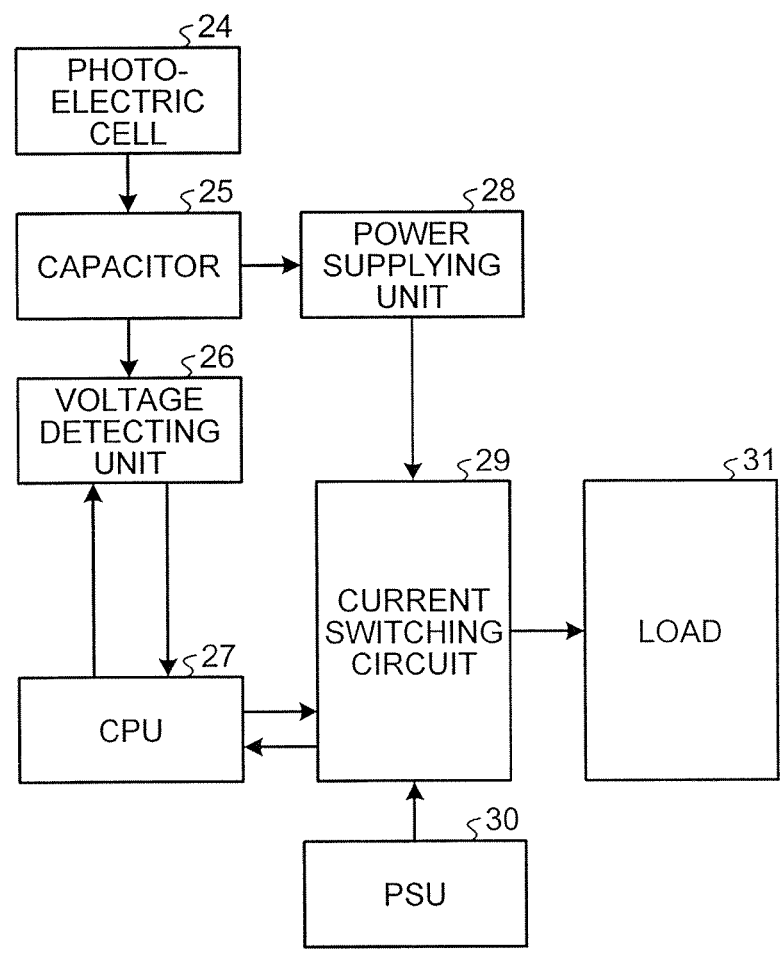
FIG. 9 is a block diagram of a power supply circuit of the image forming apparatus shown in FIG. 1.

FIG. 9 is a block diagram of a power supply circuit using the photo-electric cell 24 and a capacitor 25 of the image forming apparatus according to the embodiment. The power supply circuit includes the photo-electric cell 24 that converts the optical energy of the outgoing light from the xenon lamp 5 into electric power, the capacitor 25 that stores therein electric power output from the photo-electric cell 24, a voltage detecting unit 26 that is connected to the capacitor 25 and that detects a voltage stored in the capacitor 25, a power supplying unit 28 that converts electric power output from the photo-electric cell 24 into internal power supply of a device, a power supply unit (PSU) 30 that generates a direct current (DC) power supply for operations inside the device, a CPU 27 that controls the power supply, and a current switching circuit 29 that switches a supply current with respect to a load 31 inside the device. The voltage detecting unit 26 and the current switching circuit 29 are connected to the CPU 27 and the current switching circuit 29 is connected to the power supplying unit 28, the PSU 30, and the load 31.

The photo-electric cell 24 (17, 18, 20, 21, 22, and 23) mounted inside the image reading unit 1 generates electric power upon receiving the outgoing light from the xenon lamp 5 that emits the light on every reading of the image. For reading the image on the original document G by better illuminating the original document G, the image reading unit 1 internally includes the enclosed structure to prevent light leakage. As indicated in the first to the sixth embodiments, the photo-electric cell 24 effectively receives the light from the optical source (xenon lamp 5), and the photo-electric cell 24 is mounted on the position so that the reading of the original document is not obstructed. Thus, intense light from the xenon lamp 5 can be effectively stored in the capacitor 25 in the small area.

Electric power generated by the photo-electric cell 24 is stored in the capacitor 25. However, the amount of electric power to be generated by the photo-electric cell 24 depends on a reading count (lamp illuminating count). Because the optical source is not using sunlight and the photo-electric cell 24 is mounted inside the device, the supply of the optical energy is not sufficient. Thus, in the present embodiment, electric power stored in the capacitor 25 has reached a level at which electric power can be adequately supplied with respect to an operating voltage of the control board on which a control circuit is mounted for driving and controlling the device, and at the time of an energy saving mode, electric power is supplied to the load 31 from the capacitor 25.

An analog to digital (A/D) converter housed in the CPU 27 detects a partial pressure value of the stored power level from the control signals from the CPU 27. Upon determining that the voltage generated in the photo-electric cell 24 can be supplied to the internal control circuit, the CPU 27 executes switching of the power supply by the PSU 30 from commercial power to the power supply by the photo-electric cell 24.

Figure 10:
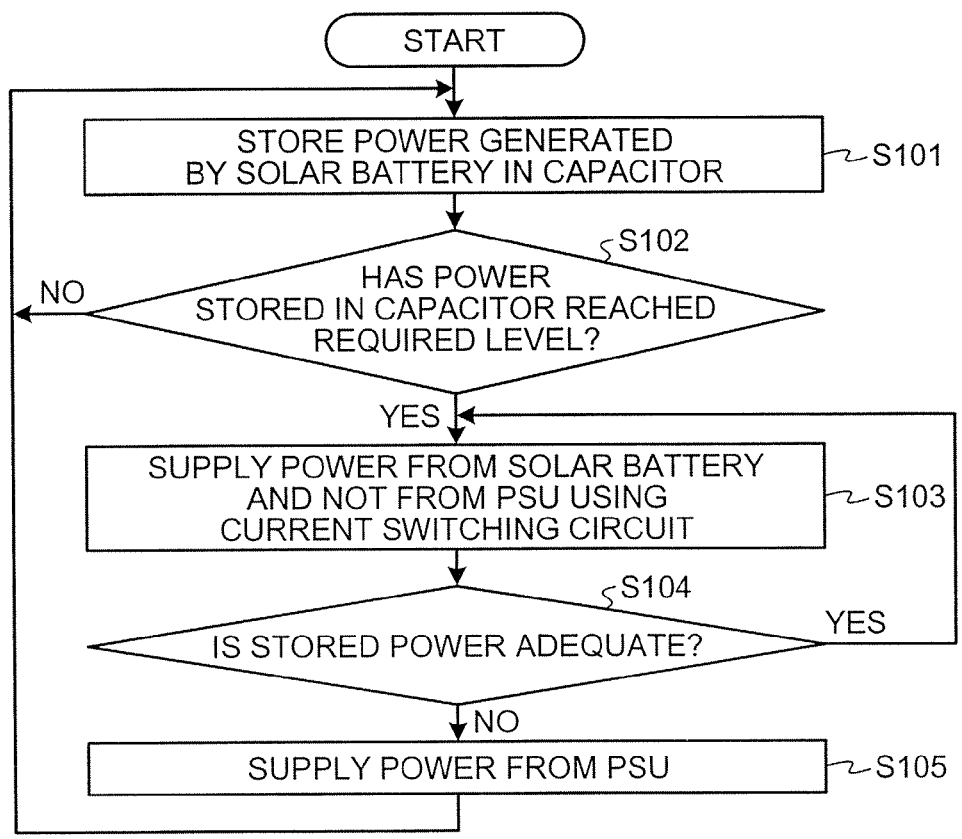
FIG. 10 is a flowchart of control processes performed by the power supply circuit shown in FIG. 9.

FIG. 10 is a flowchart of control processes performed by the power supply circuit. Specifically, power generated by the photo-electric cell 24 is stored in the capacitor 25 (Step S101). When power stored in the capacitor 25 reaches a level that is required for supplying power to the load 31 (Yes at Step S102), the current switching circuit 29 switches the supply of power from the PSU 30 to the load 31 into the supply of power from the power supplying unit 28 to the load 31 and supplies power stored in the capacitor 25 from the power supplying unit 28 to the load 31 (Step S103). The power supply is carried out as long as the level required for supplying stored power to the load is maintained (Yes at step S104). When the required level is not attained, power supply from the photo-electric cell 24 is switched to power supply from the PSU 30 (step S105). In the meantime, by returning to step S101, storing of electric power in the capacitor 25 is continued and the processes subsequent to step S102 are repeated.

Thus, the CPU 27 monitors, in the capacitor 25, a storage level of electric power generated by the photo-electric cell 24, and when the storage level reaches a level at which power can be supplied to the load 31, the CPU 27 shifts relevant components to sleep mode. If the level reduces up to the level at which electric power cannot be supplied, the CPU 27 returns to the supply from the PSU 30. Consequently, if the level is higher than the level at which power can be supplied, no electric power from an external power supply is consumed by the device at the time of the energy saving mode.

The embodiments described earlier are the exemplary embodiments of the present invention. Therefore, the invention in its broader aspects is not limited to the specific details and representative embodiments shown and described herein. Accordingly, various modifications can be made without departing from the spirit or scope of the general inventive concept as defined by the appended claims and their equivalents.

According to an embodiment of the present invention, a relative position between an optical source and an energy converting unit is set so that the relative position is not be changed at the time of reading an original document. Thus, regardless of a scanning position in which the optical source moves, a fixed amount of light can be converted into electric power and such electric power can be effectively stored.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a carriage that includes an optical source that outputs light for reading an original document, a reflector that is disposed on a side opposite to an outgoing direction of light from the optical source toward the original document, and an energy converting unit that is arranged on a reflecting surface of the reflector, and that receives light from the optical source and converts the received light into electric power for electricity storage;
   a reading unit that movably houses the carriage, and that reads an image on the original document by irradiating light from the optical source on the original document while moving the carriage in a predetermined direction, when the reading unit is reading an image; and
   an electrical storage unit that stores therein the electric power, wherein the energy converting unit is arranged in such a manner that a relative position of the energy converting unit to the optical source is always constant when the reading unit is reading an image and while moving the carriage in the predetermined direction.

2. The image forming apparatus according to claim 1, wherein the energy converting unit is mounted on a position that does not interfere with a light-receiving optical path of the reading unit.

3. The image forming apparatus according to claim 2, wherein the reading unit includes an optical system that guides, by using a plurality of mirrors, reading light for reading the original document to a photoelectric transducer, and the position corresponds to a position that does not block irradiation of the outgoing light from the optical source on the original document, and that does not block an incidence of reflected light from the original document on a first mirror that primarily receives the reflected light among the mirrors.

4. The image forming apparatus according to claim 2, wherein the reading unit includes an optical system that guides, by using a plurality of mirrors, reading light for reading the original document to a photoelectric transducer.

5. The image forming apparatus according to claim 1, wherein the energy converting unit is a photo-electric cell, and the electrical storage unit is a capacitor.

* * * * *